US010560026B2

United States Patent
Hari et al.

(10) Patent No.: US 10,560,026 B2
(45) Date of Patent: Feb. 11, 2020

(54) POWER CONVERSION EFFICIENCY USING VARIABLE SWITCHING FREQUENCY

(71) Applicant: SEMICONDUCTOR COMPONENTS INDUSTRIES, LLC, Phoenix, AZ (US)

(72) Inventors: Ajay Karthik Hari, Scottsdale, AZ (US); Dhruv Chopra, Tempe, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/034,169

(22) Filed: Jul. 12, 2018

(65) Prior Publication Data

US 2018/0337608 A1    Nov. 22, 2018

Related U.S. Application Data

(63) Continuation of application No. 15/156,033, filed on May 16, 2016, now Pat. No. 10,050,535.

(60) Provisional application No. 62/279,355, filed on Jan. 15, 2016.

(51) Int. Cl.
  *H02M 3/335*    (2006.01)
  *H02M 1/00*    (2006.01)

(52) U.S. Cl.
  CPC .......... *H02M 3/33507* (2013.01); *H02M 2001/0022* (2013.01); *H02M 2001/0054* (2013.01); *Y02B 70/1491* (2013.01)

(58) Field of Classification Search
  CPC ......... H02M 3/33507; H02M 3/33523; H02M 3/33553; H02M 3/33569; H02M 3/33592; H02M 2001/0022; H02M 2001/0054; Y02B 70/1491

USPC .......................................... 363/21.12–21.18
See application file for complete search history.

(56) References Cited

U.S. PATENT DOCUMENTS

| | | | | |
|---|---|---|---|---|
| 2,895,056 | A * | 7/1959 | Bristol | H02J 3/46 122/448.1 |
| 5,570,278 | A | 10/1996 | Cross | |
| 6,181,079 | B1 * | 1/2001 | Chang | H05B 41/28 315/224 |
| 6,768,655 | B1 * | 7/2004 | Yang | H02M 1/4225 323/222 |
| 7,869,235 | B2 * | 1/2011 | Lin | H02M 1/34 363/21.18 |
| 9,025,293 | B2 * | 5/2015 | Cannenterre | H02M 1/08 361/93.8 |
| 2009/0268489 | A1 * | 10/2009 | Lin | H02M 1/34 363/50 |

(Continued)

OTHER PUBLICATIONS

Bor-Ren Lin et al., "Analysis, design and implementation of an active clamp flyback converter," IEEE PEDS, 2005, pp. 423-429.

(Continued)

*Primary Examiner* — Yemane Mehari
(74) *Attorney, Agent, or Firm* — Dickinson Wright PLLC

(57) ABSTRACT

Power conversion efficiency using variable switching frequency. At least some of the example embodiments are power circuit controllers including a voltage sense input and a control signal output. The power circuit controller varies an output frequency of the control signal output between a first frequency and a second frequency based on a source voltage supplied to the power controller. Both the first frequency and the second frequency are non-zero.

15 Claims, 8 Drawing Sheets

(56) References Cited

U.S. PATENT DOCUMENTS

| | | | | |
|---|---|---|---|---|
| 2010/0118571 | A1* | 5/2010 | Saint-Pierre | H02M 1/4225 |
| | | | | 363/89 |
| 2012/0281326 | A1* | 11/2012 | Grulich | G01R 19/0084 |
| | | | | 361/91.2 |
| 2014/0211515 | A1* | 7/2014 | Tomioka | H02M 3/158 |
| | | | | 363/21.02 |
| 2014/0218975 | A1* | 8/2014 | Lin | H02M 3/33507 |
| | | | | 363/21.01 |
| 2014/0289548 | A1* | 9/2014 | Cannenterre | H02M 1/08 |
| | | | | 713/323 |
| 2015/0138838 | A1* | 5/2015 | Block | H02M 3/33523 |
| | | | | 363/16 |
| 2015/0295500 | A1* | 10/2015 | Mao | H02M 3/33515 |
| | | | | 363/21.13 |
| 2016/0079878 | A1* | 3/2016 | Lin | H02M 3/33592 |
| | | | | 363/21.14 |
| 2018/0226894 | A1* | 8/2018 | Teo | H02M 3/33523 |

OTHER PUBLICATIONS

Robert Watson, "Characterization of an Active Clamp Flyback Topology for Power Factor Correction Applications," IEEE Transactions on Power Electronics, vol. 11, No. 1, Jan. 1996, pp. 191-198.
R. Watson et al., "Utilization of an Active-Clamp Circuit to Achieve Soft Switching in Flyback Converters," IEEE, 1994, pp. 909-916.
Koji Yoshida et al., "Zero Voltage Switching Approach for Flyback Converter," IEEE, 15-3, 1992, pp. 324-329.

* cited by examiner

POWER CONVERSION EFFICIENCY USING VARIABLE SWITCHING FREQUENCY

CLAIM TO DOMESTIC PRIORITY

The present application is a continuation of U.S. patent application Ser. No. 15/156,033, filed May 16, 2016, which claims the benefit of U.S. Provisional Application No. 62/279,355, filed on Jan. 15, 2016, which applications are incorporated herein by reference.

BACKGROUND

Power distribution in today's world generally consists of power mains transmitting alternating current power signals. Computers, LED lights, and other electronic devices commonly use power conversion circuits to transform the electric current from a power main to a voltage signal usable by the device. The power conversion circuitry provided takes up space on the device, and also wastes power in the conversion.

Manufacturers of electronic devices quest for more efficient and higher density power supplies. Increasing the density of power conversion circuits is a firmly established trend in low to medium voltage DC-to-DC power supplies. However, the AC-to-DC market has been largely immune to the trend for three primary reasons. First, electromagnetic interference (EMI) standards are less stringent at switching frequencies under 150 kHz. Switching frequencies have typically been limited so that the fundamental frequency of EMI emissions is below 150 kHz. Second, passive devices, and in particular transformer core materials, have not kept pace with the advancements in semiconductor devices. Third, high voltage switches, e.g., greater than 650 V, had poor Figure of Merit (FoM) until recently. The first obstacle, related to EMI emissions of switch-mode power supplies, is easily overcome with zero voltage switching (ZVS), as is well known. With advances being made in high voltage switches, including new and exciting wide-bandgap semiconductor devices, new topologies of switch-mode power supplies are in play. One such topology is the active clamp flyback (ACF) power converter.

ACF converters have appeared in literature since the mid-1990s. However, ACF converters have not been widely used, and have primarily been seen in low volume designs. The ACF topology is a fixed switching frequency topology that utilizes the energy stored in the parasitics of the circuit to achieve ZVS, rather than dissipating the energy into a snubber circuit. The waveforms resulting from ACF operation show reduced spikes, which improves EMI relative to conventional switch mode power supplies. However, ACF converters utilize two MOSFETs and require an additional half-bridge driver. The additional parts of an ACF converter increased costs and resulted in low usage in cost sensitive and high volume markets such as laptop power adapters and light emitting diode (LED) lighting.

Recent implementations of the classic flyback converter have approached the topology's limits of efficiency and power density. Quasi-resonant flyback is a variant of the classic flyback topology that gets quasi-ZVS and shows potential for pushing power density higher. However, quasi-resonant flyback includes a frequency that varies with load current, and doesn't solve the problem of dissipating leakage energy. On the other hand, the ACF topology, with a fixed frequency operation while achieving ZVS, is very attractive for further development. The ACF topology solves the efficiency puzzle while lowering EMI emissions.

DETAILED DESCRIPTION OF THE DRAWINGS

The following describes one or more embodiments with reference to the figures, in which like numerals represent the same or similar elements. While the figures are described in terms of the best mode for achieving certain objectives, the description is intended to cover alternatives, modifications, and equivalents as may be included within the spirit and scope of the disclosure.

Figure 1:
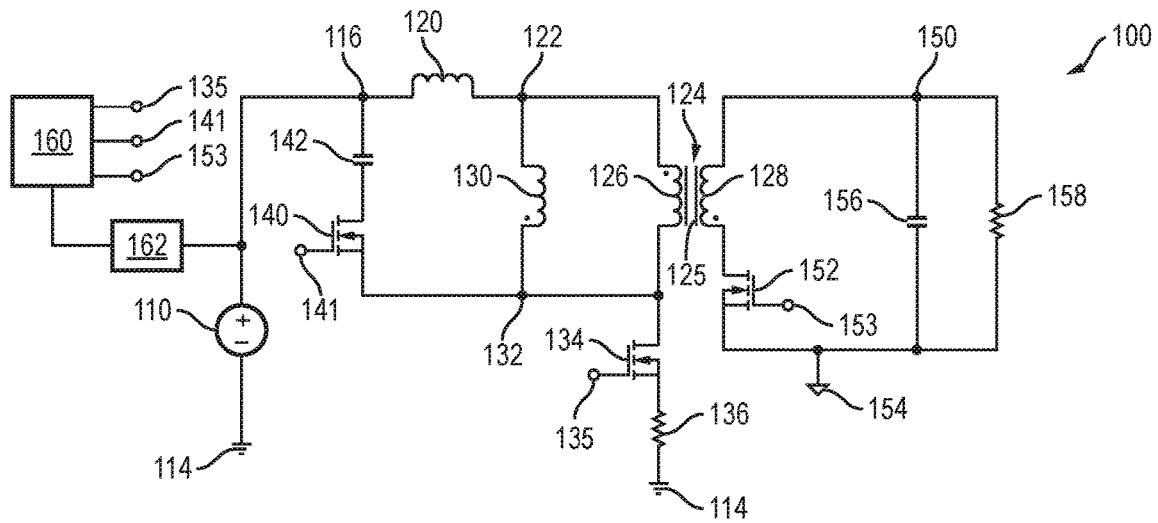
FIG. 1 illustrates an exemplary circuit diagram of the power conversion circuit.

FIG. 1 illustrates a circuit diagram of a power conversion circuit 100. Power conversion circuit 100 is an active clamp flyback (ACF) power converter. Power conversion circuit 100 includes a voltage source 110 coupled between ground node 114 and circuit node 116. Voltage source 110 provides a DC electrical power signal to power conversion circuit 100 at circuit node 116, and represents an external source of electrical power connected to a device that includes power conversion circuit 100. In some embodiments, voltage source 110 is an alternating current (AC) voltage source, e.g., power mains at a home or office. A rectifier, e.g., a full-wave bridge rectifier, is provided coupled between voltage source 110 and circuit node 116. A filter capacitor keeps the voltage potential of circuit node 116 near the peak voltage potential of voltage source 110 when the instantaneous voltage of voltage source 110 falls below the peak.

Power conversion circuit 100 includes a flyback transformer 124 having core 125, primary winding 126, and secondary winding 128. Inductance 120 is coupled between voltage source 110 and primary winding 126 of flyback transformer 124. Inductance 120 is a lump inductor representing leakage inductance of primary winding 126 as well as other inductances external to flyback transformer 124. Magnetizing inductor 130 is used in analysis to represent the magnetizing current through primary winding 126. Flyback transformer 124 transfers electrical power from primary winding 126 to secondary winding 128 via a magnetic field in core 125. Flyback transformer 124 can be analyzed as coupled inductors rather than as a transformer in the classical sense. Flyback transformer 124 is not used to provide transformer action. The electrical current that magnetizes core 125 and couples primary winding 126 and secondary winding 128 magnetically is referred to as the magnetizing current. In a classical flyback converter, magnetizing current flows through primary winding 126 during energy storage mode, and flows through secondary winding 128 during resonant energy transfer mode to charge output capacitor 156.

Primary winding 126 is coupled between circuit node 122 and circuit node 132. MOSFET 134 includes a drain terminal coupled to circuit node 132, a gate terminal 135, and a source terminal coupled to resistor 136. Resistor 136 is coupled between the source terminal of MOSFET 134 and ground node 114. MOSFET 140 includes a source terminal coupled to circuit node 132, a gate terminal 141, and a drain terminal coupled to capacitor 142. Capacitor 142 is coupled between the drain terminal of MOSFET 140 and circuit node 116. MOSFET 140 and capacitor 142 operate together as an active clamp.

Secondary winding 128 of flyback transformer 124 is coupled between circuit node 150 and a drain terminal of MOSFET 152. MOSFET 152 also includes a gate terminal 153 and a source terminal coupled to ground node 154. Output capacitor 156 and resistor 158 are coupled in parallel between ground node 154 and circuit node 150. Resistor 158 represents the load of power conversion circuit 100 to simplify analysis. Resistor 158 in FIG. 1 is selected to represent the approximate load expected from components of an electronic device that uses power conversion circuit 100. The components of power conversion circuit 100 illustrated in FIG. 1 are each a discrete component mounted or formed on a PCB or substrate of an electronic device. In other embodiments, one or more components of power conversion circuit 100 are integrated into a single semiconductor die or package.

A controller integrated circuit (IC) 160 has outputs coupled to gate terminal 141 of MOSFET 140, gate terminal 135 of MOSFET 134, and gate terminal 153 of MOSFET 152. MOSFETs 134, 140, and 152 are n-channel MOSFETs, indicating that negative carriers, or electrons, are the majority carrier for electric current through the MOSFETs. In other embodiments, p-channel MOSFETs are used that have positive electron holes as the majority carrier. An n-channel MOSFET provides low electrical resistance between a drain terminal and a source terminal of the n-channel MOSFET when a voltage potential of a gate terminal is sufficiently high. With the gate of the MOSFET at ground potential, or at least below a threshold, a larger electrical resistance is exhibited between the drain and source of the MOSFET.

In the ideal case, an n-channel MOSFET exhibits zero resistance when its gate has a positive voltage potential, and exhibits infinite resistance when its gate is at ground potential. MOSFETs 134, 140, and 152 operate as switches which are opened and closed by control signals from controller 160 coupled to the MOSFETs' respective gates. A switch, e.g., MOSFETs 134, 140, and 152, being closed is also referred to as the switch being "on," because electric current is able to flow between terminals of the switch. An open switch is referred to as being "off" because current does not flow significantly between terminals of the switch. While MOSFETs are illustrated as the switches of power conversion circuit 100, other types of electronically controlled switches, e.g., bipolar-junction transistors (BJTs), are used in other embodiments. MOSFETs include source and drain terminals, which are conduction terminals, and a gate terminal as a control terminal. BJTs include emitter and collector terminals, which are conduction terminals, and a base terminal as a control terminal.

A voltage sensing circuit 162 is coupled between circuit node 116 and an input of controller 160. Voltage sensing circuit 162 senses the voltage potential being supplied to power conversion circuit 100 by voltage source 110 and communicates the magnitude of the voltage potential to controller 160. Voltage sensing circuit 162 includes a voltage divider to scale the voltage at circuit node 116 to a voltage acceptable to an analog-to-digital converter input of controller 160. In one embodiment, voltage sensing circuit 162 includes an analog-to-digital converter and sends a digital value representative of a voltage potential to controller 160. In another embodiment, voltage sensing circuit 162 includes a latch or other memory element and outputs a one-bit digital value representative of whether the input voltage is a high line or low line voltage potential. As described below, controller 160 modifies a switching frequency for MOSFETs 134, 140, and 152 based on the voltage sensed by voltage sensing circuit 162 to improve efficiency of power conversion circuit 100.

Circuit node 116 includes an approximately steady DC voltage potential provided by voltage source 110, either directly or via a rectifier coupled between voltage source 110 and circuit node 116. The voltage output at circuit node 150 is given by equation 1.

$$Vout = Vin * \frac{D}{1-D} * \frac{Ns}{Np} \qquad \text{Equation (1)}$$

In equation 1, Vout is the DC output voltage at circuit node 150, and Vin is the DC input voltage at circuit node 116. D is the duty cycle of the control signal at gate terminal 135 of MOSFET 134. Np is the number of turns of primary winding 126 around core 125, and Ns is the number of windings of secondary winding 128 around core 125.

Controller 160 controls the flow of electrical current from voltage source 110 to the components of power conversion circuit 100 by switching MOSFET 134, MOSFET 140, and MOSFET 152 periodically. In general, power conversion circuit 100 operates in two different modes of operation. With MOSFET 134 closed, or on, power conversion circuit 100 is in energy storage mode. With MOSFET 134 open, or off, power conversion circuit 100 is in resonant energy transfer mode.

In energy storage mode, controller 160 turns on MOSFET 134 so that current flows from voltage source 110 through inductance 120, primary winding 126, magnetizing inductor 130, MOSFET 134, and resistor 136 to ground node 114. Controller 160 turns off MOSET 140. Energy is stored in flyback transformer 124 as current through primary winding 126 increases. Magnetizing inductor 130, as well as inductance 120, is magnetically charged at an approximately linear rate, similar to the operation of a classic flyback converter. MOSFET 152 is open so that current through secondary winding 128 is cut off, and power is not transferred from primary winding 126 to secondary winding 128. In other embodiments, a diode is used to rectify current through secondary winding 128. The diode is off due to being reverse biased rather than due to a control signal from controller 160.

As current through primary winding 126 increases, the current through resistor 136 also increases. The increasing current through resistor 136 results in increasing voltage across resistor 136. Resistor 136 is a current sense resistor. Controller 160 receives the voltage across resistor 136 at a current sense input to sense the magnitude of current through primary winding 126. When using current mode control, controller 160 switches power conversion circuit 100 from energy storage mode to resonant energy transfer mode when the voltage across resistor 136 reaches a threshold based on a feedback signal from the output voltage at circuit node 150.

The feedback signal is a voltage potential generated by comparing an output voltage potential, at circuit node 150, to a fixed reference voltage using an op-amp or other comparator circuit. In another embodiment, the feedback voltage routed to controller 160 is a function of load current through the load represented by resistor 158. In other embodiments, the feedback signal is a function of both load current and input voltage.

Controller 160 transitions power conversion circuit 100 from energy storage mode to resonant energy transfer mode by opening, or turning off, MOSFET 134. Current through resistor 136 to ground node 114 is cut off, but current continues to flow through primary winding 126, inductance 120, and magnetizing inductor 130 due to the energy stored in core 125 during energy storage mode. As current continues to flow through primary winding 126, the magnetizing current through magnetizing inductor 130 charges the output capacitance of MOSFET 134 and other lump capacitance, e.g., parasitic capacitance of primary winding 126. The output capacitance of MOSFET 134 is charged in a resonant manner, but can be modelled as linear due to the brief time frame of charging.

Once the MOSFET 134 capacitance is charged, the voltage at circuit node 132 rises and forward biases a body diode in MOSFET 140. Current flows through the body diode of MOSFET 140 to capacitor 142. Since capacitor 142 is much larger than the output capacitance of MOSFET 134, nearly all of the magnetizing current through magnetizing inductor 130 is diverted to charge capacitor 142.

The voltage across primary winding 126 decreases, and quickly reaches the point where the voltage across secondary winding 128 is positive at circuit node 150. Once circuit node 150 includes a positive voltage, MOSFET 152 is closed to allow current to flow through secondary winding 128 and resonant energy transfer mode begins.

Resonant energy transfer mode of power conversion circuit 100 begins once circuit node 150 includes a positive voltage relative to ground node 154. During resonant energy transfer mode, inductance 120 begins resonating with capacitor 142 with a resonant frequency, $F_{res}$, given by equation 2.

$$F_{res}=1/(2*\pi*\sqrt{L_{120}*C_{142}})$$ Equation (2)

$L_{120}$ in equation 2 is the value of inductance 120. $C_{142}$ in equation 2 is the value of capacitor 142. The resonant current is given by equation 3.

$$I_{res}=I_m*\cos(\omega*t)$$ Equation (3)

In equation 3, $I_{res}$ is the resonant current through inductance 120. $I_m$ is the magnetizing current through magnetizing inductor 130. Omega, or $\omega$, is the angular frequency at which power conversion circuit 100 is operating, and t is time. MOSFET 152 is closed, or on, so that current induced in secondary winding 128 flows to create a positive voltage at circuit node 150.

MOSFET 152 is closed during resonant energy transfer mode to allow current induced in secondary winding 128 to charge output capacitor 156 and power a load. MOSFET 152 is opened during energy storage mode to reduce current flowing the opposite direction discharging output capacitor 156. MOSFET 152 provides active, or synchronous, rectification of the current induced in secondary winding 128. Output capacitor 156 operates as a filter capacitor to keep circuit node 150 near a regulated voltage potential. The electric charge at circuit node 150 creates an electric current through resistor 158 to ground node 154, powering the load represented by resistor 158.

To end resonant energy transfer mode, and transition back to energy storage mode, controller 160 first switches off MOSFET 140, effectively removing capacitor 142 from the circuit. Current flowing from capacitor 142 to primary winding 126 is disrupted by MOSFET 140 opening. A new resonant network is formed by inductance 120 and the output capacitance of MOSFET 134, and the output capacitance of MOSFET 134 is discharged. To fully discharge the output capacitance of MOSFET 134, the energy stored in inductance 120 should be larger than the energy stored in the output capacitance of MOSFET 134. That is, Equation 4 should be true.

$$L_{120}*I^2>C_{134}*V^2$$ Equation (4)

Once the output capacitance of MOSFET 134 is sufficiently discharged, a body diode of MOSFET 134 becomes forward biased and begins conducting. The current of secondary winding 128 decays, and MOSFET 134 can be switched back on under ZVS conditions to complete the transition back to energy storage mode. MOSFET 152 is turned off to reduce electrical current in secondary winding 128 flowing to ground node 154.

Figure 2A:
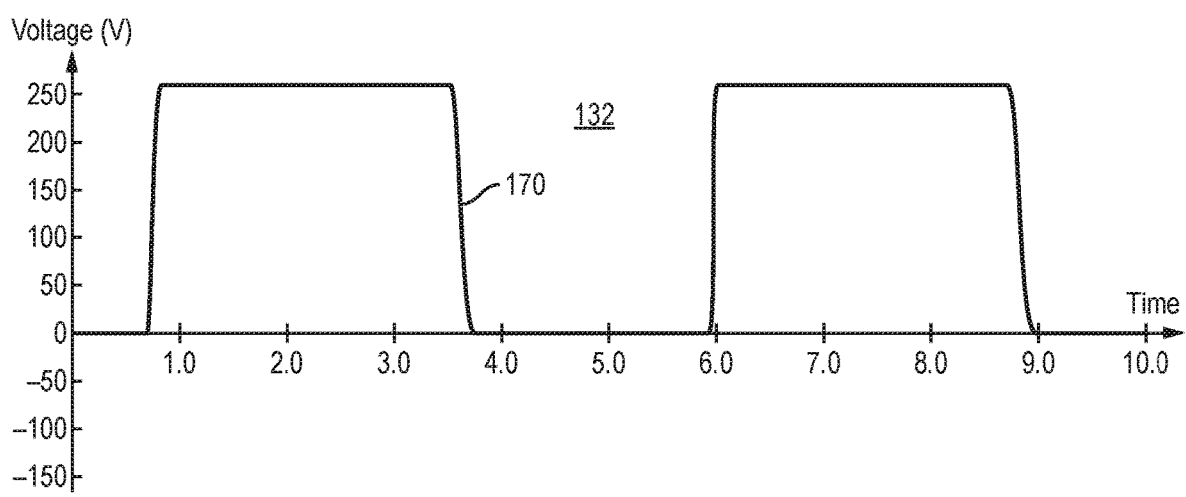
FIGS. 2a-2d illustrate current and voltage waveforms at various circuit nodes of the power conversion circuit.

FIGS. 2a-2d illustrate timing of current and voltage signals at various points of power conversion circuit 100. While specific timing is shown, the signal transitions occur at different times when power conversion circuit 100 is operated at a different frequency or with a different duty cycle. FIG. 2a illustrates a timing diagram of voltage potential at circuit node 132 as plot 170. Plot 170 is at approximately ground potential when MOSFET 134 is closed because circuit node 132 is coupled to ground node 114 via MOSFET 134 and resistor 136. At time zero in FIG. 2a, MOSFET 134 is already closed, and plot 170 is at approximately zero volts. At approximately 0.7 microseconds (μs) in FIG. 2a, controller 160 turns off MOSFET 134, and the voltage potential at circuit node 132 rapidly increases to approximately the voltage of voltage source 110 plus the voltage reflected from secondary winding 128. In FIG. 2a, circuit node 132 reaches the high voltage by approximately 0.8 μs. Circuit node 132 remains high until controller 160 closes MOSFET 134 at approximately 3.5 μs. The time when MOSFET 152 is open, and plot 170 is high, between 0.8 μs and 3.6 μs corresponds to the resonant energy transfer mode of power conversion circuit 100. The rise time of plot 170, between approximately 0.7 and 0.8 μs, represents the transition from energy storage mode to resonant energy transfer mode. The voltage potential at circuit node 132 returns to approximately ground potential by approximately 3.7 μs. Controller 160 opens MOSFET 134 again just prior to 6.0 μs. The time when MOSFET 134 is closed, between approximately 3.7 μs and 6.0 μs corresponds to the energy storage mode of power conversion circuit 100. The falling time of plot 170, between approximately 3.5 μs and 3.7 μs, corresponds to a transition from resonant energy transfer mode to energy storage mode.

The operating frequency of power conversion circuit 100 is defined by the rate at which controller 160 switches MOSFET 134. In FIG. 2a, the period of plot 170 is approximately 5.2 μs, for a frequency of approximately 192 kilohertz (kHz). Plot 170 includes a duty cycle above 50%, i.e., plot 170 is approximately 260V for a longer period of time than plot 170 is approximately ground potential. In one embodiment, controller 160 regulates the output voltage at circuit node 150 by changing the duty cycle of plot 170.

Figure 2B:
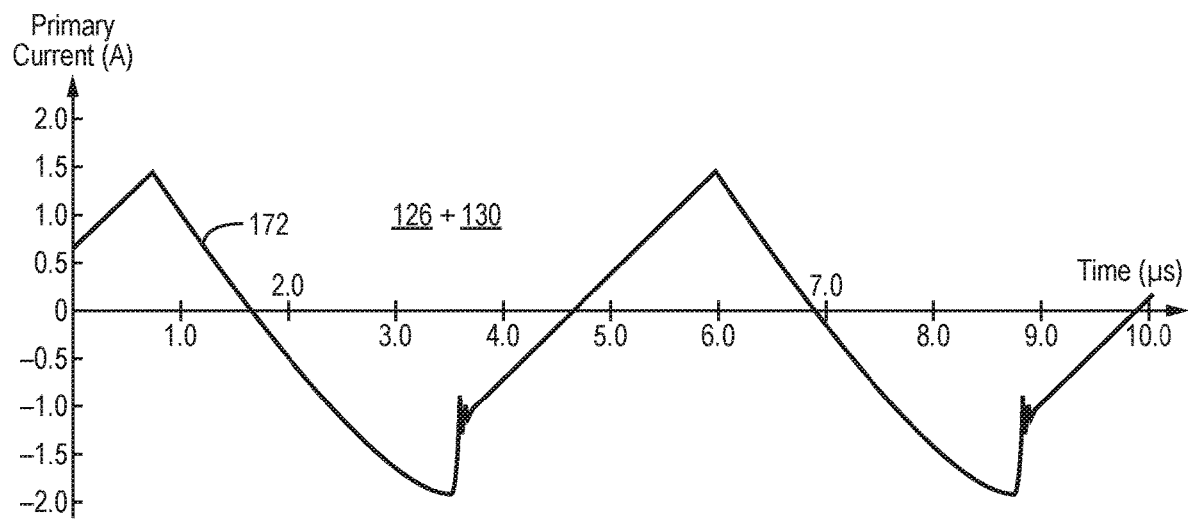

FIG. 2b illustrates a timing diagram of electric current flowing through the primary side of flyback transformer 124 as would be seen with an oscilloscope. Because magnetizing inductor 130 represents the magnetizing current of flyback transformer 124, magnetizing inductor 130 is an analytical construct. Current measured through the primary side of flyback transformer 124, plotted in FIG. 2b as primary current 172, includes the resonant current flowing through inductance 120 during the resonant energy transfer mode, summed with the magnetizing current through magnetizing inductor 130.

Figure 2C:
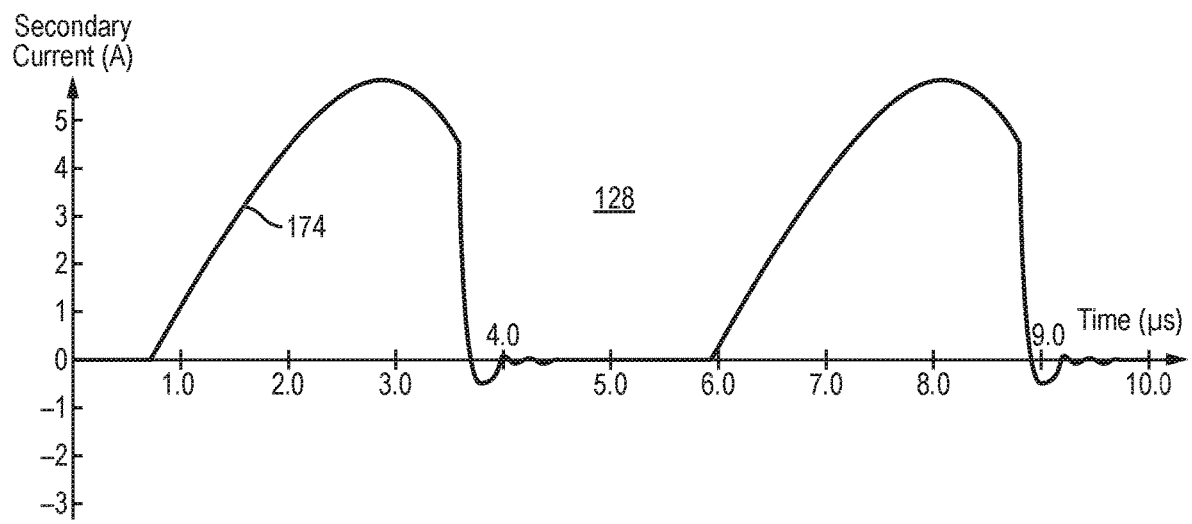

During the time period between 0.8 μs and 3.5 μs, while MOSFET 134 is open and power conversion circuit 100 is in resonant energy transfer mode, current through primary winding 126 decreases from a positive value to a negative value in a resonant manner as defined by equation 3. Controller 160 closes MOSFET 152 so that current induced in secondary winding 128 by primary current 172 powers the load, e.g., resistor 158, and charges output capacitor 156. FIG. 2c illustrates secondary current 174 induced in secondary winding 128, which mirrors the difference between the resonant current of primary winding 126 and the magnetizing current through magnetizing inductor 130. From 3.5 μs to 6.0 μs, while MOSFET 134 is closed, primary current 172 through the primary side of flyback transformer 124 increases from a negative value to a positive value approximately linearly. Controller 160 opens MOSFET 152 to reduce the amount of current allowed to flow through secondary winding 128. Allowing current through secondary winding 128 to reverse direction would discharge output capacitor 156, counter to the goal of powering a load with output capacitor 156 during the period when MOSFET 152 is closed. Current through secondary winding 128 remains approximately zero while MOSFET 152 is opened and MOSFET 134 is closed.

Figure 2D:
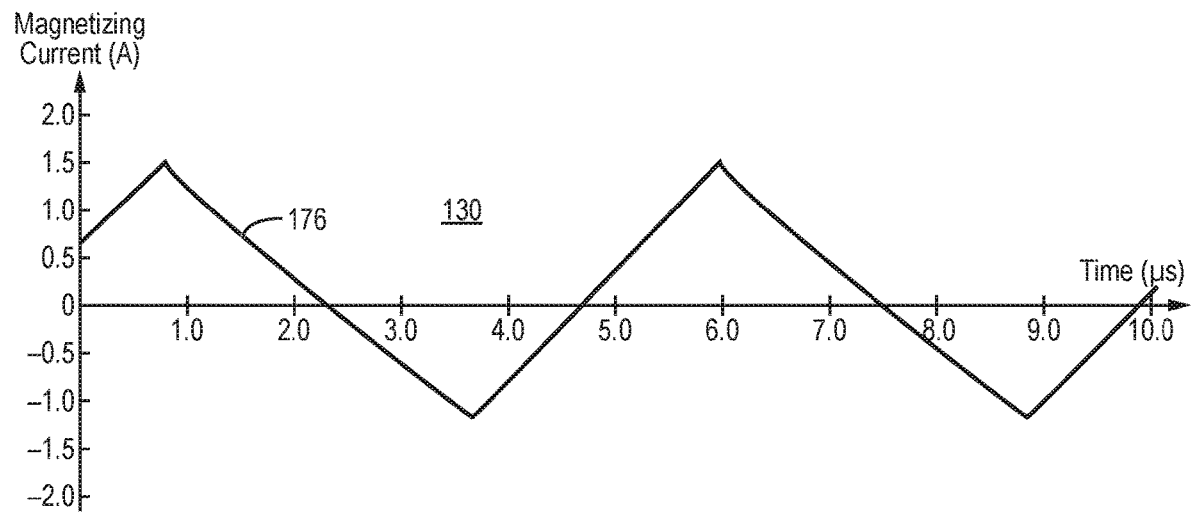

FIG. 2d illustrates magnetizing current 176 flowing through magnetizing inductor 130. Magnetizing current 176 is not directly measurable because magnetizing inductor 130 is an analytical tool and not a physical inductor. Rather, magnetizing current 176 is a mathematical construction calculated by subtracting secondary current 174 from the primary current 172. Between 0.8 μs and 3.4 μs, while power is being transferred between primary winding 126 and secondary winding 128, the magnetizing current falls to magnetize core 125 of flyback transformer 124. After 3.7 μs, magnetizing current 176 reverses direction and increases from a negative value to a positive value. Magnetizing current 176 changing in the positive direction demagnetizes core 125 of flyback transformer 124 to reset the magnetization of the core for the next power cycle beginning at approximately 6.0 μs.

Magnetizing current 176 is not directly measurable in switch mode power supplies using an active clamp flyback topology. Magnetizing current 176 is a mathematical construction based on the difference between primary current 172 and secondary current 174. An oscilloscope is used to directly measure primary current 172 in the primary winding of flyback transformer 124, and secondary current 174 in secondary winding 128. Secondary current 174 is subtracted from primary current 172 to determine magnetizing current 176.

Magnetizing current 176 in an active clamp flyback converter, such as power conversion circuit 100, operates in continuous current mode (CCM). Therefore, even at light load and standby conditions magnetizing current 176 is continuously circulating back and forth through magnetizing inductor 130. In some embodiments, controller 160 provides an option to operate in discontinuous current mode.

Figure 3A:
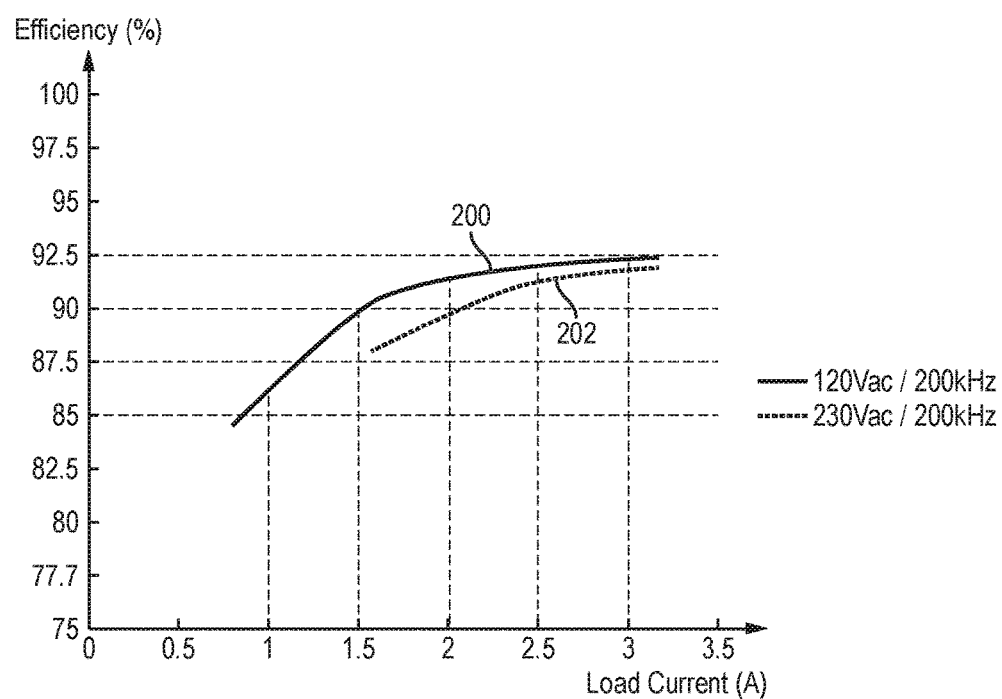
FIGS. 3a and 3b illustrate conversion efficiency of the power conversion circuit relative to input voltage, load current, and switching frequency.
Figure 3B:
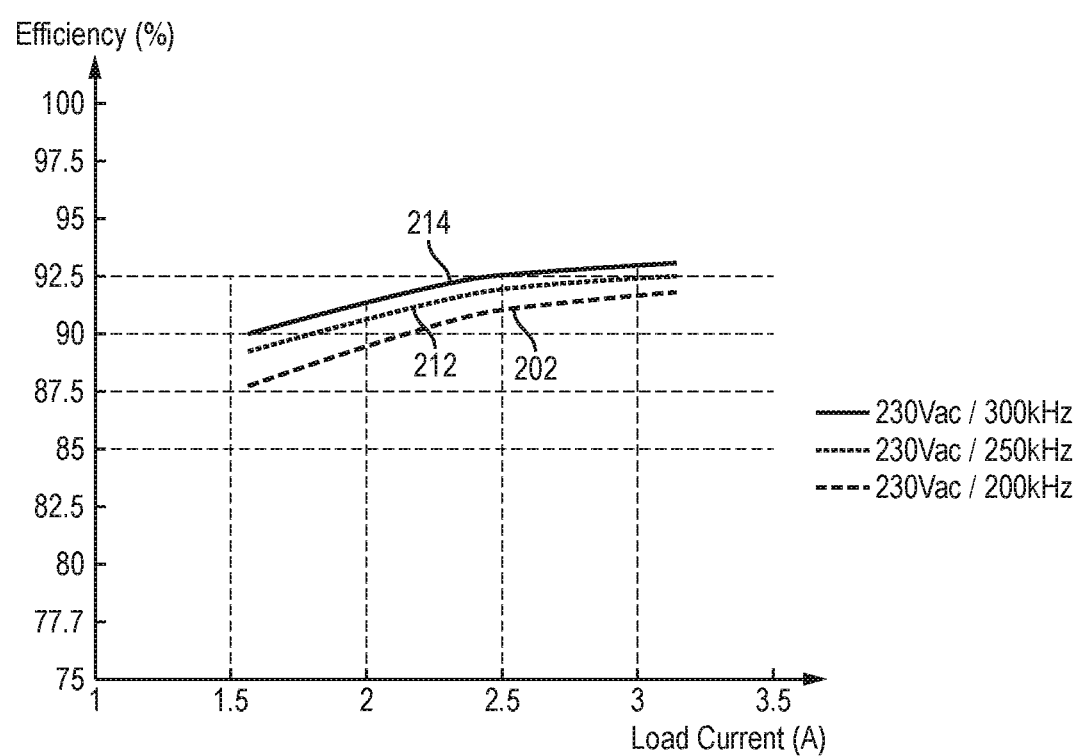

FIGS. 3a and 3b illustrate the conversion efficiency of power conversion circuit 100 at low line input voltage (e.g., 120 V) relative to power conversion circuit 100 at high line input voltage (e.g., 230 V). The actual voltage potential of low line and high line changes depending upon the geographic location and other factors. Low line voltage potential may be 100 V, 110 V, 115 V, 120 V, 122 V, or another similar voltage potential. High line voltage potential may be 210 V, 212 V, 220 V, 230 V, 240 V, or another similar voltage potential. FIG. 3a shows efficiency curve 200 as a solid line illustrating the efficiency of power conversion circuit 100 at low line input and 200 kHz switching frequency across a range of load currents and with an output voltage of 20 V DC. Efficiency curve 202 is shown as a dashed line and illustrates the efficiency of power conversion circuit 100 at high line and 200 kHz across a range of load currents.

Load current, illustrated on the horizontal, or X, axis of FIG. 3a, represents the electrical current in Amperes flowing through resistor 158, or other load connected to power conversion circuit 100. Efficiency percentage, illustrated in the vertical, or Y, axis of FIG. 3a represents the percentage of electrical power input to power conversion circuit 100 which is output to the load. A higher efficiency is desirable and means that less energy is wasted in the components of power conversion circuit 100.

FIG. 3a shows that a significant gap in efficiency exists between high line and low line voltage inputs. FIG. 3b illustrates efficiency with high line voltage input to power conversion circuit 100 at different operating frequencies. Efficiency curve 202 illustrates an operating frequency of 200 kHz, efficiency curve 212 illustrates an operating frequency of 250 kHz, and efficiency curve 214 illustrates an operating frequency of 300 kHz. FIG. 3b illustrates that efficiency increases with increasing operating frequency at high line conditions. The efficiency of power conversion circuit 100 at high line is brought closer to the efficiency at low line by increasing the operating frequency at high line relative to low line conditions.

Figure 4A:
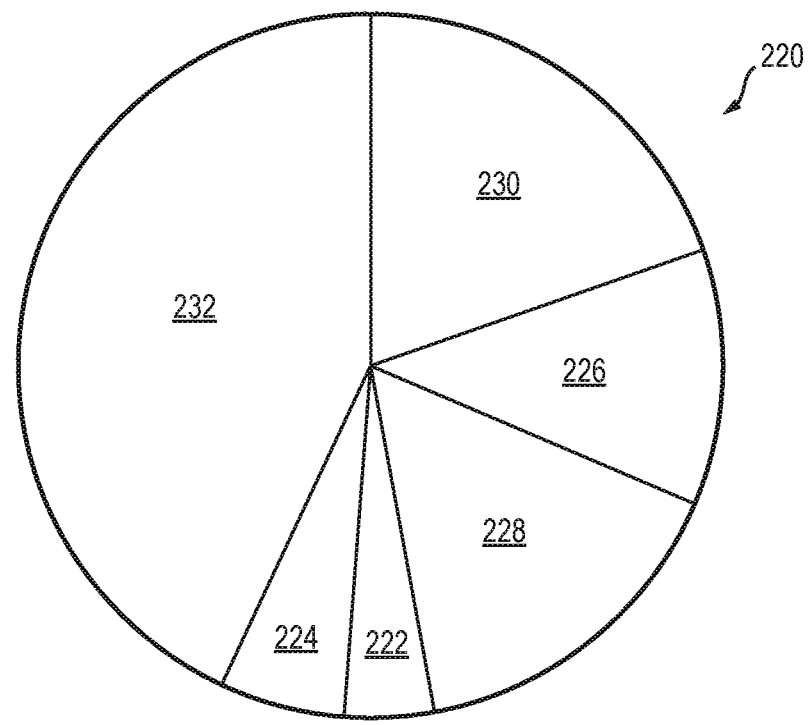
FIGS. 4a-4c illustrate core losses in a transformer of the power conversion circuit.
Figure 4B:
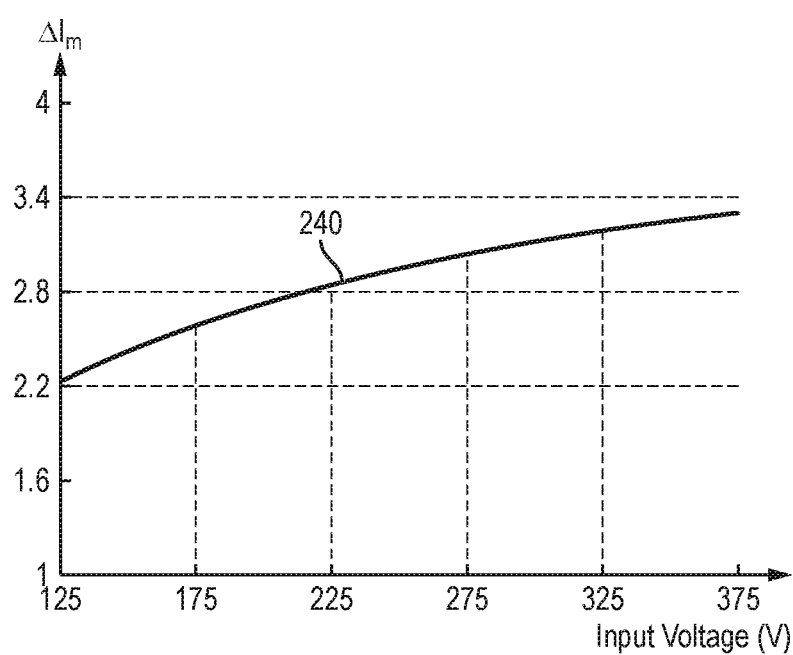
Figure 4C:
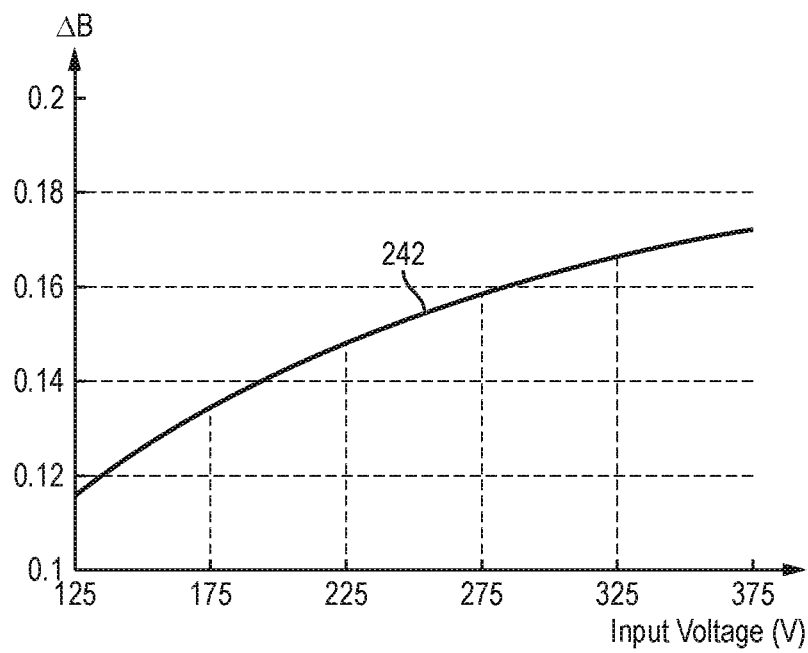

FIGS. 4a-4c illustrate one reason why increasing operating frequency of power conversion circuit 100 increases efficiency. FIG. 4a illustrates a pie chart 220 of the inefficiencies of power conversion circuit 100. Pie chart 220 as a whole represents substantially the entire inefficiency in power conversion circuit 100. For instance, if power conversion circuit 100 is operating at 90% efficiency, then pie chart 220 represents the remaining 10% of electric power input to power conversion circuit 100 that is not output to the load.

Pie chart 220 illustrates 6 factors which contribute to the inefficiency of power conversion circuit 100. Slice 222 illustrates power lost in resistor 136 of power conversion circuit 100. Resistor 136 provides important information to controller 160 for the operation of power conversion circuit 100, but reduces efficiency.

Slice 224 illustrates the power lost in controller 160 and other driver circuitry required to operate MOSFET 134 and MOSFET 140. In one embodiment, a half-bridge driver is used to drive MOSFETs 134 and 140, and the power used by the half-bridge driver contributes to slice 224. Slice 226 illustrates the power lost in driver circuitry of MOSFET 152 and the losses of MOSFET 152 from both switching and conduction. Slice 228 represents the power loss of the diode bridge that converts AC from voltage source 110 to DC power at circuit node 116 in embodiments which use an AC voltage source with a rectifier stage.

Slice 230 in FIG. 4a illustrates conduction and switching losses experienced as electrical current flows through MOSFET 134 and MOSFET 140. Switching loss refers to the power lost in a MOSFET because of the additional current through the MOSFET while the MOSFET switches from open to closed or closed to open. Conduction loss refers to the power lost in a MOSFET due to electrical resistance of the MOSFET while on or closed. Conduction loss is approximately proportional to the on-resistance ($R_{DS(ON)}$) of a MOSFET and the magnitude of current flowing through the MOSFET. Power conversion circuit 100 operates with zero-voltage switching (ZVS), so switching losses are limited. ZVS is achieved by allowing magnetizing current 176 to reach a negative value prior to MOSFET 134 being closed by controller 160. For most calculations, switching losses of MOSFETs on the primary side of power conversion circuit 100, i.e., MOSFET 134 and MOSFET 140, are negligible.

Slice 232 of pie chart 220 illustrates energy lost in core 125 of flyback transformer 124. Core loss is generated by a changing magnetic field, B, within core 125 of flyback transformer 124, because core 125 does not have a perfectly efficient magnetic response. Magnetizing and demagnetizing core 125 requires work. As is seen in FIG. 4a, the power loss associated with magnetizing and demagnetizing core 125 is the largest portion contributing to inefficiency of power conversion circuit 100. Improving the efficiency of magnetizing flyback transformer 124 has a large potential to increase the total efficiency of power conversion circuit 100.

The transformer losses represented by slice 232 are a function of ΔB and the switching frequency ($F_{SW}$) that power conversion circuit 100 operates at. Delta-B, written with the Greek letter as ΔB, of a transformer is the peak-to-peak magnitude of the magnetic field in the core of the transformer. Magnetizing current 176 of FIG. 2d generates a magnetic field which magnetizes core 125 of flyback transformer 124 as the magnetizing current decreases, and demagnetizes core 125 of flyback transformer 124 as the magnetizing current increases. The magnetic field, B, in core 125 of flyback transformer 124 fluctuates along with the magnetizing current. The difference in magnitude of the magnetic field in core 125 between a low peak and a high peak is ΔB. $F_{SW}$ is the frequency at which controller 160 switches MOSFETs 134, 140, and 152 over a full cycle.

FIG. 4b illustrates $\Delta I_m$ versus input voltage as curve 240. $\Delta I_m$ is the peak-to-peak magnitude of magnetizing current 176. At a constant output voltage and constant switching frequency, $\Delta I_m$ increases with input voltage as shown by curve 240 in FIG. 4b. The embodiment of FIG. 4b includes an output voltage at circuit node 150 of 20 V and a switching frequency of 200 kHz. Equation 5 shows a generalized formula for calculating $\Delta I_m$.

$$\Delta I_m = (V_{in} \cdot D)/(L_{pri} \cdot F_{SW}) \quad \text{Equation (5)}$$

$V_{in}$ in equation 5 is the DC voltage at circuit node 116. D is the duty cycle of the control signal from controller 160 at gate terminal 135. $L_{pri}$ is the inductance value of primary winding 126. $F_{SW}$ is the switching frequency of the control signal from controller 160 at gate terminal 135.

In some embodiments, controller 160 modifies the value of D to regulate the output voltage at circuit node 150. With a higher input voltage at circuit node 116, a lower duty cycle is used to maintain a similar voltage output at circuit node 150. In one embodiment, equation 6 is used by controller 160 to determine the duty cycle, D, to use in controlling MOSFET 134.

$$D = V_{out}/(V_{out} + n \cdot V_{in}) \quad \text{Equation (6)}$$

Equation 6 defines a duty cycle that can be used with a given input voltage $V_{in}$ at circuit node 116 to achieve a desired output voltage $V_{out}$ at circuit node 150. The variable "n" in equation 6 is the turns ratio of flyback transformer 124, i.e., the number of turns of secondary winding 128 divided by the number of turns of primary winding 126.

FIG. 4c illustrates curve 242, which is ΔB over a range of voltage potentials of voltage source 110. The embodiment of FIG. 4c has the same switching frequency, 200 kHz, and output voltage, 20 V, as FIG. 4b. Curve 242 shows that ΔB increases with input voltage similarly to $\Delta I_m$ in FIG. 4b. In practice, the magnetic field in core 125, B, is caused by the magnetizing current, $I_m$, so ΔB is a function of $\Delta I_m$. The magnetizing loss in core 125 increases with input voltage because both $\Delta I_m$ and ΔB increase. Providing power to power conversion circuit 100 by plugging an electronic device into a high line power main, e.g., 230 V, reduces the efficiency relative to plugging the electronic device into a low line power main, e.g., 125 V.

Equation 7, below, illustrates one formula usable to calculate ΔB. ΔB is a function of $\Delta I_m$, showing how FIG. 4b relates to FIG. 4c.

$$\Delta B = (L_{pri} \cdot \Delta I_m)/(N_{pri} \cdot A_c) \quad \text{Equation (7)}$$

In equation 7, $\Delta I_m$ is calculated by equation 5, and is the peak-to-peak value of magnetizing current 176 through the primary side of flyback transformer 124. $N_{pri}$ in equation 7 is the number of turns of primary winding 126 around core 125. $A_c$ is the cross-sectional area of core 125.

The power loss in core 125, due to magnetizing and demagnetizing of the core material, is calculable using Steinmetz's equation. Steinmetz's equation is used to calculate the core loss of magnetic materials due to magnetic hysteresis. Applying Steinmetz's equation to power conversion circuit 100 yields equation 8.

$$P_C = K \cdot F_{SW}^{\alpha} \cdot \Delta B^{\beta} \quad \text{Equation (8)}$$

$P_C$ is the power lost in core 125 to magnetize the material of core 125, and is a function of ΔB and $F_{SW}$. As long as alpha (α) in equation 8 is smaller than beta (β), the ΔB component dominates the $F_{SW}$ component.

Figure 5:
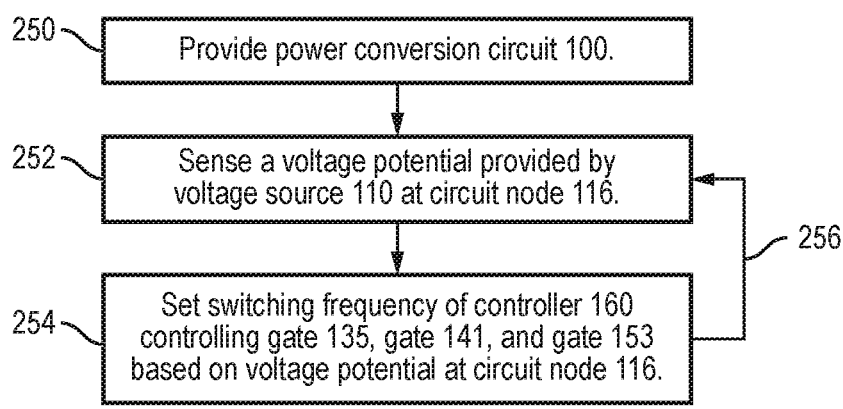
FIG. 5 illustrates a method of improving conversion efficiency by increasing switching frequency of the power conversion circuit at high line conditions.

FIG. 5 illustrates a method of increasing efficiency of a switch mode power supply by shifting the operating frequency with input voltage. Beginning at step 250, a power conversion circuit 100 is provided. Power conversion circuit 100 is the active clamp flyback converter illustrated in FIG. 1 in one embodiment.

At step 252, a voltage potential of circuit node 116 is sensed. The voltage potential at circuit node 116 is provided by voltage source 110, in conjunction with a rectifier if voltage source 110 is an AC voltage source. The voltage potential of circuit node 116 is determined by voltage sensing circuit 162 and communicated to controller 160. In some embodiments, the voltage potential is communicated to controller 160 as an analog or digital value proportional to the sensed voltage. In other embodiments, voltage sensing circuit 162 simply generates a single binary value indicating whether a low line or high line condition is detected.

At step 254, controller 160 sets a switching frequency of power conversion circuit 100 based on the sensed voltage potential at circuit node 116. In the case where controller 160 receives information as to whether a high line or low line condition is detected, controller 160 simply utilizes a first switching frequency for low line conditions and a second switching frequency for high line conditions.

One strategy for increasing frequency at high line conditions is to keep $\Delta I_m$ approximately constant across input voltages. By using equation 5 above for both high-line and low-line input voltages, and setting the formulas equal to each other, one skilled in the art can determine the high line frequency needed to maintain an approximately equal $\Delta I_m$ as during low line conditions. Solving for high line frequency, $F_h$, and replacing the variable D in equation 5 with the formula in equation 6, yields equation 9 below.

$$F_h = V_h \cdot F_l \cdot (n \cdot V_l + V_{out}) / V_l (n \cdot V_h + V_{out}) \quad \text{Equation (9)}$$

$F_l$ in equation 9 is the switching frequency that controller 160 uses at low line conditions. $V_l$ is the voltage of circuit node 116 during low line conditions, e.g., 120 V, and $V_h$ is the voltage of circuit node 116 during high line conditions. $V_{out}$ is the target output DC voltage and n is the turns ratio of flyback transformer 124. Equation 5 is solved in advance, prior to manufacture of power conversion circuit 100, and controller 160 is programmed with high line and low line frequencies which keep $\Delta I_m$ approximately constant between high line and low line input voltages. In other embodiments, equation 5 is recalculated on the fly by controller 160 each time the voltage potential of circuit node 116 is sensed.

In embodiments where controller 160 receives an analog or digital value proportional to the voltage potential at circuit node 116, controller 160 utilizes a formula to calculate a desired switching frequency. Controller 160 is programmed with a target $\Delta I_m$ and uses equations 5 and 6 in combination, solved for $F_{SW}$, to determine a switching frequency to achieve the target $\Delta I_m$ given the sensed input voltage.

In any case, the switching frequency of power conversion circuit 100 is increased as input voltage is increased, with the goal of maintaining $\Delta I_m$ at an approximately constant value. If switching frequency is not increased at high line conditions, $\Delta I_m$ increases, which increases core losses in core 125 and reduces efficiency. Keeping $\Delta I_m$ approximately constant by modifying the switching frequency of power conversion circuit 100 keeps the efficiency of power conversion circuit 100 from being significantly reduced at high line conditions. Steinmetz's equation shows, in equation 8 above, that as long as α is smaller than β, ΔB is the dominant factor in determining core losses. Even though a higher frequency increases that component of equation 8, the overall core losses go down on account of a lower $\Delta I_m$, and thus a lower ΔB, at a higher frequency. Preventing significant increase of $\Delta I_m$ also reduces power loss due to conduction losses through MOSFET 134, MOSFET 144, resistor 136, and the effective resistance of primary winding 126.

Arrow 256 in FIG. 5 illustrates an optional repeating of steps 252 and 254. In some embodiments where only the existence of either a high line or low line condition is communicated to controller 160, steps 252 and 254 are performed once each time power conversion circuit 100 is powered on. In some embodiments where controller 160 receives a signal proportional to the input voltage, steps 252 and 254 are repeated periodically to account for small changes in input voltages that may occur over time. Periodically updating switching frequency to account for a wandering input voltage provides an actual $\Delta I_m$ value that is closer to the target $\Delta I_m$ value programmed in controller 160.

Figure 6A:
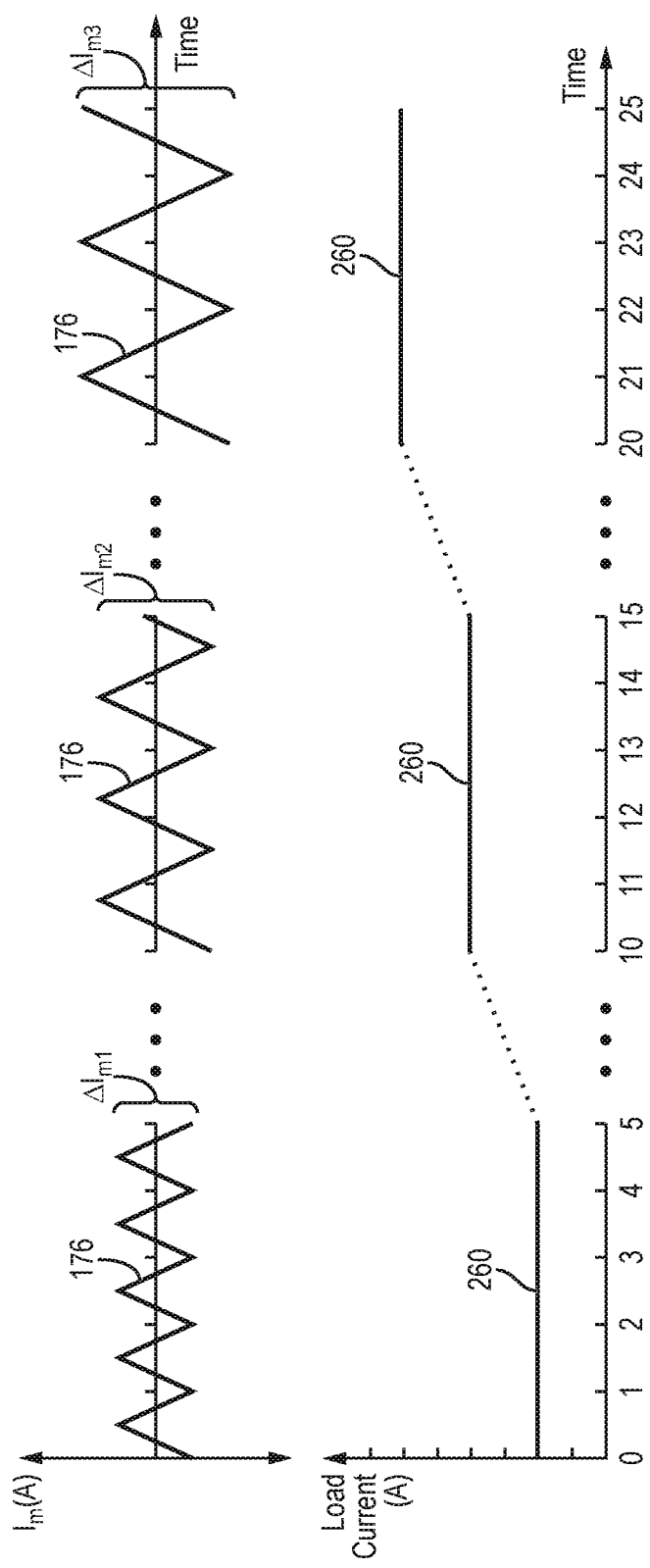
FIGS. 6a and 6b illustrate varying switching frequency along with a changing load current to improve efficiency.

In addition to modifying switching frequency along with input voltage, as illustrated in FIG. 5, the switching frequency used by controller 160 is also modified as a function of load current in other embodiments. Load current of power conversion circuit 100 is the electric current through resistor 158, which represents the load provided by components of an electronic device powered by power conversion circuit 100. FIG. 6a illustrates load current 260 increasing as time passes. Between 0 and 5 on the horizontal time scale, load current 260 is at a low value. Between time 10 and time 15, load current 260 is at an intermediate value, and between time 20 and time 25, load current 260 is relatively high.

FIGS. 3a and 3b illustrate that when load current is lower, e.g., between time 0 and time 5 in FIG. 6a, efficiency is reduced. At lower load currents, a smaller $\Delta I_m$ is required to achieve ZVS. Therefore, controller 160 increases the switching frequency of power conversion circuit 100 to increase efficiency at lower load currents. FIG. 6a illustrates $\Delta I_m$ operating at a higher frequency between time 0 and time 5, an intermediate frequency between time 10 and time 15, and a lower frequency between time 20 and time 25. An increased switching frequency results in a lower $\Delta I_m$ and a lower ΔB as a result of a shorter period for magnetically charging core 125. FIG. 6a shows the higher frequency of magnetizing current 176 from time 0 to time 5 resulting in a lower $\Delta I_m$, while the lower frequency of magnetizing current 176 from time 20 to time 25 results in a larger magnitude $\Delta I_m$.

A reduction in $\Delta I_m$ increases efficiency, but a minimum $\Delta I_m$ is required to achieve zero voltage switching (ZVS) of MOSFET 134. To achieve ZVS, magnetizing current 176 needs to be a negative value prior to MOSFET 134 being closed by controller 160. Switching frequency can be increased to any extent at low load current, and ZVS is still achieved as long as magnetizing current 176 reaches a negative value before MOSFET 134 is turned on.

Figure 6B:
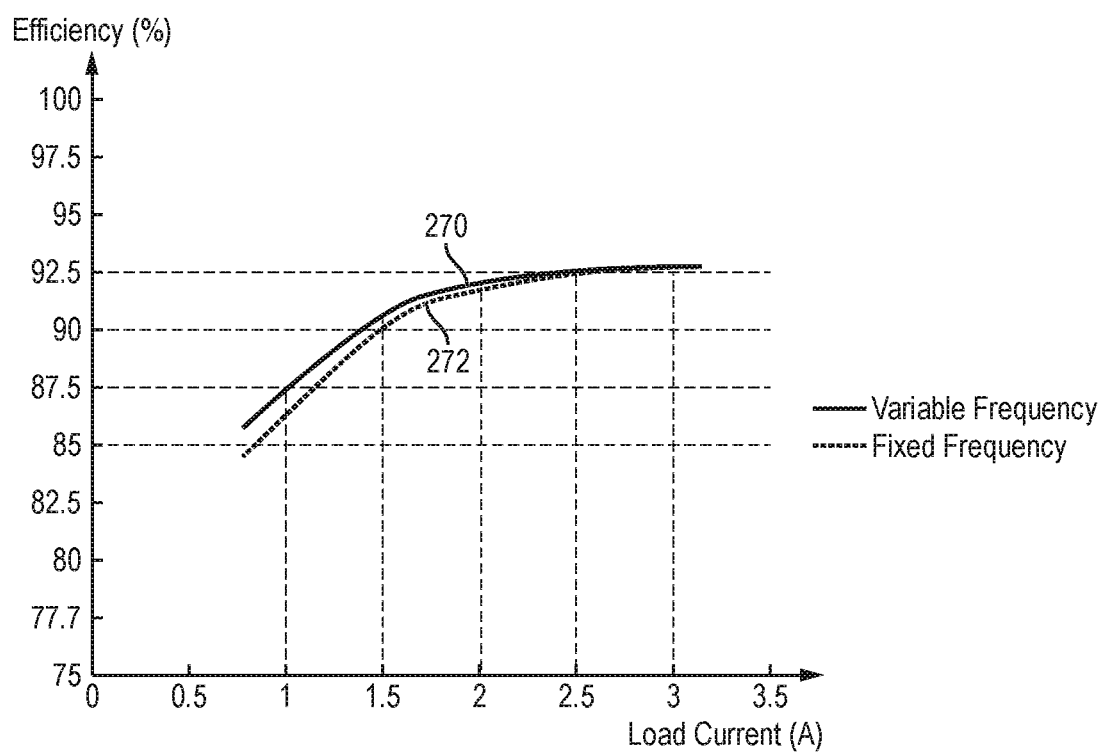

FIG. 6b illustrates efficiency gains achievable by varying switching frequency with load current. Curve 270 illustrates efficiency across a range of load currents when switching frequency is varied along with load current. Curve 272 illustrates efficiency across a range of load currents when switching frequency is held constant. A gap between curve 270 and curve 272 illustrates that significant efficiency gains can be achieved by varying the switching frequency used by controller 160 to switch MOSFETs 134, 140, and 152. Significant efficiency gains are achieved because ZVS is achievable with reduced magnetizing current, $\Delta I_m$. A smaller $\Delta I_m$ results in a smaller ΔB. Steinmetz's equation in equation 8 dictates that a lower ΔB will result in lower core losses, even at the cost of increased frequency, as long as alpha (α) in equation 8 is smaller than beta (β). Reducing $\Delta I_m$ also reduces conduction losses in MOSFET 134, MOSFET 140, resistor 136, and primary winding 126.

Load current is determined by a feedback signal from the secondary side of flyback transformer 124 that indicates the magnitude of electrical current being drawn by the load, e.g., resistor 158. Controller 160 receives the feedback signal indicating load current, but not the signal indicating input voltage from voltage sensing circuit 162, in some embodiments that modify switching frequency based on load current and not input voltage. In one embodiment, voltage sensing circuit 162 receives a signal proportional to the load current of power conversion circuit 100. The feedback signal from voltage sensing circuit 162 to controller 160 is generated as a function of both load current through resistor 158 and input voltage at circuit node 116. When voltage sensing circuit 162 generates a control signal as a function of both input voltage and load current, controller 160 is able to use a single feedback signal to increase efficiency both at different input voltages, as illustrated in FIG. 5, and at different load conditions, as illustrated in FIGS. 6a and 6b. In other embodiments where controller 160 modifies the switching frequency of power conversion circuit 160 based on input voltage and not load current, the control signal from voltage sensing circuit 162 to controller 160 is simply based on input voltage without considering load current.

Power conversion circuit 100 is an active clamp flyback converter that works in continuous current mode (CCM). When a lower magnetizing inductance is used, magnetizing current 176 swings both positive and negative. Negative magnetizing current enables ZVS by discharging capacitor 142 before MOSFET 134 is turned on. Controller 160 of power conversion circuit 100 operates at a variable frequency that is a function of load current, input voltage, or both load current and input voltage. Varying operating frequency of power conversion circuit 100 reduces the peak-to-peak value of the magnetizing current through primary winding 126, i.e., $\Delta I_m$. Reducing $\Delta I_m$, and thus $\Delta B$, when power conversion circuit 100 is coupled to a high line, while maintaining zero voltage switching operation, improves overall efficiency of power conversion circuit 100. Reduction of total electric current through primary winding 126 also reduces conduction losses in MOSFET 134 and copper losses in flyback transformer 124. One strategy is to maintain a relatively constant $\Delta I_m$ and $\Delta B$ across all voltage input conditions. Increasing switching frequency with decreasing load improves overall efficiency. Increasing switching frequency with increasing input voltage improves overall efficiency.

While one or more embodiments have been illustrated in detail, the skilled artisan will appreciate that modifications and adaptations to those embodiments may be made without departing from the scope of the present disclosure.

What is claimed:

1. A power circuit controller, comprising:
a voltage sense input;
a main switch output;
an active clamp switch output; and
the power circuit controller configured to:
sense a peak magnitude of a direct current (DC) voltage at the voltage sense input;
generate a main switch signal on the main switch output having an output frequency that varies between a first frequency and a second frequency based on the peak magnitude of the DC voltage at the voltage sense input, and wherein both the first frequency and the second frequency are non-zero; and
generate an active clamp signal on the active clamp switch output having the output frequency.

2. The power circuit controller of claim 1, wherein the power circuit controller is configured to select the first frequency when the peak magnitude of the DC voltage indicates a low line voltage source, and the power circuit controller is configured to select the second frequency when the peak magnitude of the DC voltage indicates a high line voltage source.

3. The power circuit controller of claim 2, wherein the first frequency is lower than the second frequency.

4. The power circuit controller of claim 2, wherein the power circuit controller is programmed with a value of the first frequency and a value of the second frequency.

5. The power circuit controller of claim 1, further including a voltage sensing circuit coupled between the voltage sense input and a circuit node of a power circuit.

6. The power circuit controller of claim 5, wherein the voltage sensing circuit outputs a binary signal to the power circuit controller indicating whether the voltage sense input is coupled to a high line voltage or a low line voltage.

7. The power circuit controller of claim 1, wherein the power circuit controller is configured to vary the output frequency proportionally to the peak magnitude of the DC voltage at the voltage sense input.

8. A power converter controller, comprising:
an input terminal;
a main switch terminal;
an active clamp terminal;
a secondary rectifier terminal; and
a controller integrated circuit configured to:
sense a value indicative of peak magnitude of a direct current (DC) voltage at the input terminal;
generate a main switch signal on the main switch terminal having an operating frequency that varies between a first non-zero frequency and a second non-zero frequency based on the value indicative of peak magnitude of the (DC) voltage at the input terminal;
generate an active clamp signal on the active clamp terminal having the operating frequency; and
generate a rectifier signal on the secondary rectifier terminal having the operating frequency.

9. The power converter controller of claim 8, wherein the controller integrated circuit is configured to set the operating frequency at the first non-zero frequency when the value indicative of peak magnitude of the (DC) voltage indicates the input terminal is coupled to a low line voltage source, and the controller integrated circuit is configured to set the signal frequency at the second non-zero frequency when the value indicative of peak magnitude of the (DC) voltage indicates the input terminal is coupled to a high line voltage source, wherein the first non-zero frequency is lower than the second non-zero frequency.

10. The power converter controller of claim 8, further including a voltage sensing circuit coupled between the input terminal and a circuit node of a power circuit.

11. The power converter controller of claim 8, wherein the controller integrated circuit is configured to vary between the first non-zero frequency and the second non-zero frequency proportionally to the peak magnitude of the DC voltage at the input terminal.

12. The power converter controller of claim 8, wherein the controller integrated circuit is configured to vary the operating frequency inversely proportional to load.

13. A power supply controller, comprising:
an input terminal;
a main switch terminal; and
a controller integrated circuit configured to:
sense an input voltage at the input terminal;
calculate a switching frequency that results in a peak-to-peak magnetizing current that is predetermined, wherein the switching frequency resides between and including a first frequency and a second frequency, and wherein the first frequency and the second frequency are non-zero; and
generate a main switch signal on the main switch terminal at the switching frequency.

14. The power supply controller of claim 13, wherein the switching frequency is directly proportional to the input voltage.

15. The power supply controller of claim 13, wherein the controller integrated circuit is programmed with a plurality of values of the switching frequency as a function of input voltage at the input terminal.

* * * * *